United States Patent
Bell et al.

(10) Patent No.: US 7,372,706 B2
(45) Date of Patent: May 13, 2008

(54) SURGE PROTECTION

(75) Inventors: Ronnie L. Bell, Nashua, NH (US); Conrad J. Baranowski, Westford, MA (US); Newton R. Aquino, Laguna (PH); Piyush Saxena, Cranston, RI (US)

(73) Assignee: American Power Conversion Corporation, West Kingston, RI (US)

( * ) Notice: Subject to any disclaimer, the term of this patent is extended or adjusted under 35 U.S.C. 154(b) by 391 days.

(21) Appl. No.: 10/766,055

(22) Filed: Jan. 28, 2004

(65) Prior Publication Data

US 2005/0047049 A1   Mar. 3, 2005

Related U.S. Application Data

(60) Provisional application No. 60/443,061, filed on Jan. 28, 2003.

(51) Int. Cl.
*H05K 9/00* (2006.01)

(52) U.S. Cl. .................. 361/799; 361/753; 174/32

(58) Field of Classification Search .............. 361/753, 361/799, 800, 816, 818; 174/32, 350, 35 R, 174/35 GC
See application file for complete search history.

(56) References Cited

U.S. PATENT DOCUMENTS 5,534,662 A * 7/1996 Peacock et al. ............ 174/355
5,708,552 A * 1/1998 Han et al. ................... 361/799
6,080,930 A * 6/2000 Lommen et al. ............ 174/355
6,284,970 B1 * 9/2001 Buskmiller et al. ......... 174/377
6,483,023 B1 * 11/2002 Jacques ..................... 174/358
6,552,915 B2 * 4/2003 Takahashi et al. .......... 361/796
6,654,255 B2 * 11/2003 Kruse et al. ................ 361/799
7,042,737 B1 * 5/2006 Woolsey et al. ............ 361/799

* cited by examiner

*Primary Examiner*—Tuan T. Dinh
*Assistant Examiner*—Dameon E Levi
(74) *Attorney, Agent, or Firm*—Townsend and Townsend and Crew LLP

(57) ABSTRACT

A rack-mountable in-line surge protection system includes a chassis configured to mount to an equipment rack, the chassis including: an electrically-conductive buss, an electrically-conductive ground member coupled to the buss and configured and disposed to be connected to a grounding mechanism, and a plurality of electrically-conductive bias members coupled to the buss. The system further includes surge-protection modules configured to be removably inserted into and coupled to the chassis, the modules each including a printed circuit board and a plurality of receptacles for receiving connectors and coupling the connectors to the circuit board, the circuit boards each including a grounding contact portion and surge protection circuitry, where the chassis and the modules are configured such that the circuit boards are disposed between respective bias members when inserted in the chassis, with the grounding contact portion of each circuit board in electrical contact with at least a respective one of the bias members.

24 Claims, 18 Drawing Sheets

PNETR5
CAT 5 5/10/100/BaseT VOIP

P232R
RS232 Protector

SURGE PROTECTION

CROSS-REFERENCE TO RELATED ACTIONS

This application claims the benefit of U.S. Provisional Application No. 60/443,061 filed Jan. 28, 2003, the contents of which are incorporated here by reference.

FIELD OF THE INVENTION

The invention relates to surge protection and more particularly to surge protection for electronic data lines.

BACKGROUND OF THE INVENTION

Surge protection is very important for many entities, e.g., for data (including voice as used herein) service providers. Surge protectors guard against undesirable bursts of energy ruining expensive equipment, causing data loss, and/or creating annoying if not hazardous sounds on voice lines.

Various products exist for providing surge protection to data lines (that may include, as used herein, voice and/or non-voice, e.g., Internet traffic or file transfer, communications). Typically, such systems provide surge protection for multiple data lines using hardwired surge protection circuitry. As this circuitry fails, which is a common occurrence, the systems can be returned to the vendor for repair/replacement of the failed circuitry, or be scrapped.

SUMMARY OF THE INVENTION

In general, in an aspect, the invention provides a rack-mountable in-line surge protection system including a chassis configured to mount to an equipment rack, the chassis including: an electrically-conductive buss, an electrically-conductive ground member coupled to the buss and configured and disposed to be connected to a grounding mechanism, and a plurality of electrically-conductive bias members coupled to the buss. The system further includes surge-protection modules configured to be removably inserted into and coupled to the chassis, the modules each including a printed circuit board and a plurality of receptacles for receiving connectors and coupling the connectors to the circuit board, the circuit boards each including a grounding contact portion and surge protection circuitry, where the chassis and the modules are configured such that the circuit boards are disposed between respective bias members when inserted in the chassis, with the grounding contact portion of each circuit board in electrical contact with at least a respective one of the bias members.

Implementations of the invention may include one or more of the following features. The chassis is configured with a plurality of guides for guiding the printed circuit boards of the modules into the chassis and in between the bias members. The chassis provides slots with walls of the slots serving as the guides. The grounding contact portions of the printed circuit boards extend at least as far as a distance between locations where the bias members contact the circuit boards the modules are fully inserted into the chassis. At least one of the module and the chassis includes a member for interfering with the other of the module and the chassis with the module received by the chassis to inhibit separation of the module from the chassis. Each module includes a bias arm for engaging a ledge of the chassis to retain the modules in the chassis. The bias arms are configured to deflect in response to a threshold of force being applied to the modules to permit removal of the modules from the chassis.

In general, in another aspect, the invention provides a chassis for use in a rack of electronic data communications equipment and with modules configured for data communications, the chassis including a housing configured to provide a plurality of openings sized and shaped to receive the modules, and configured to be mounted in the rack, an electrically-conductive buss coupled to the housing and extending along a length of the housing, an electrically-conductive ground member coupled to the buss and configured and disposed to be connected to a grounding mechanism, and multiple electrically-conductive bias members coupled to the buss and configured and disposed to contact and be biased against portions of respective circuit boards of the modules with the modules received by the chassis.

Implementations of the invention may include one or more of the following features. The bias members are disposed in opposing pairs. Two pairs of the bias members are disposed to receive each circuit board. The housing provides guides for guiding the circuit boards into contact with the bias members. The housing defines a plurality of slots with the walls of the slots serving as the guides. The housing defines a top and a bottom slot for each of the circuit boards.

In general, in another aspect, the invention provides a replaceable module for use with a rack-mountable data communications chassis that provides a plurality of openings each configured for receiving the module, the module including a circuit board configured to provide surge-protection between an input and an output, and a housing connected to the circuit board, the housing defining a plurality receptacles for receiving a plurality of data connectors, the receptacles disposed such that connectors received by the receptacles will electrically couple to the input and the output, respectively, of the circuit board, the housing including an inhibiting member configured and disposed to interfere with a portion of the chassis with the module received by the chassis such that separation of the module from the chassis is inhibited.

Implementations of the invention may include one or more of the following features. The inhibiting member is flexible and includes a tab, the inhibiting member being configured to have the tab urged inwardly by the chassis during insertion of the module into the chassis and to move outwardly when the tab aligns with an opening provided by the chassis such that the tab will interfere with the chassis if the module and chassis are urged to separate. The tab is rounded. The housing includes a plurality of grip portions configured to be grasped by a user for pulling the housing to separate the module from the chassis. The grip portions provide grooves extending transverse to a direction of insertion of the module into the housing. The housing provides two grip portions that extend away from a front face of the housing and that are disposed near a top and a bottom of the housing, respectively.

In general, in another aspect, the invention provides a rack-mountable in-line surge protection system including a chassis configured to mount to an equipment rack, the chassis providing a plurality of receptacles, the chassis providing a grounding network from an interior of the chassis to a terminal configured to be connected to by an external ground connector, and multiple modules configured to be repeatedly inserted into and removed from the receptacles, the modules each being configured to connect to a plurality of data line connectors, and to provide a surge-protected electrical connection between the plurality of connectors connected to each module, where the modules and the chassis are configured such that the modules and the chassis will inhibit separation of the modules and the chassis if the modules are urged to separate from the chassis, and to allow separation of the modules from the chassis upon application of at least a threshold separation force.

Implementations of the invention may include one or more of the following features. The chassis and the modules are configured such that the threshold separation force is at least about 1 pound. The chassis and the modules are configured such that the threshold separation force is at least about 2 pounds. The chassis has a height of about 1U. Surge protection of different modules is configured differently to provide surge protection for different types of data lines, and wherein the modules each include a visual indication of a type of data line for which the surge protection of the respective module is configured.

Various aspects of the invention may provide one or more of the following advantages. Surge protection circuitry can be replaced in the field, by customers, without returning a surge protection system to the vendor. A surge protection system can be rack mounted. A rack-mount surge protection system can be provided that is as small as a 1U high chassis. A surge protection system can be arbitrarily configured to accommodate various types of data lines. A surge protection system can be modified to accommodate different arrangements of data line types. Loss of grounding due to partial removal of surge protection modules may be guarded against. Modules can be assembled blindly in a chassis, with a ground connection being made automatically.

These and other advantages of the invention, along with the invention itself, will be more fully understood after a review of the following figures, detailed description, and claims.

DETAILED DESCRIPTION OF PREFERRED EMBODIMENTS

Embodiments of the invention provide a rack-mounted data-line surge protection system. The system includes modular, replaceable surge protection circuitry for various types of data lines. The system may include a chassis that is 1U (i.e., one standard rack unit of height of about 1.75 in.) high and 19" wide configured for mounting in an equipment rack and for accommodating up to 24 of the surge protection circuit modules, although other heights and other numbers of modules may be used. Different module types can be mixed and matched in the chassis. The modules each include two receptacles for receiving data line connectors, and can be easily replaced by disconnecting the connectors that are plugged into the two receptacles, removing the module, inserting a new module, and reconnecting the connectors. Other numbers of connectors (e.g., 4, etc.) could be used in one or more of the modules. The system can self-align the modules upon insertion. Other embodiments are within the scope of the invention.

Figure 1:
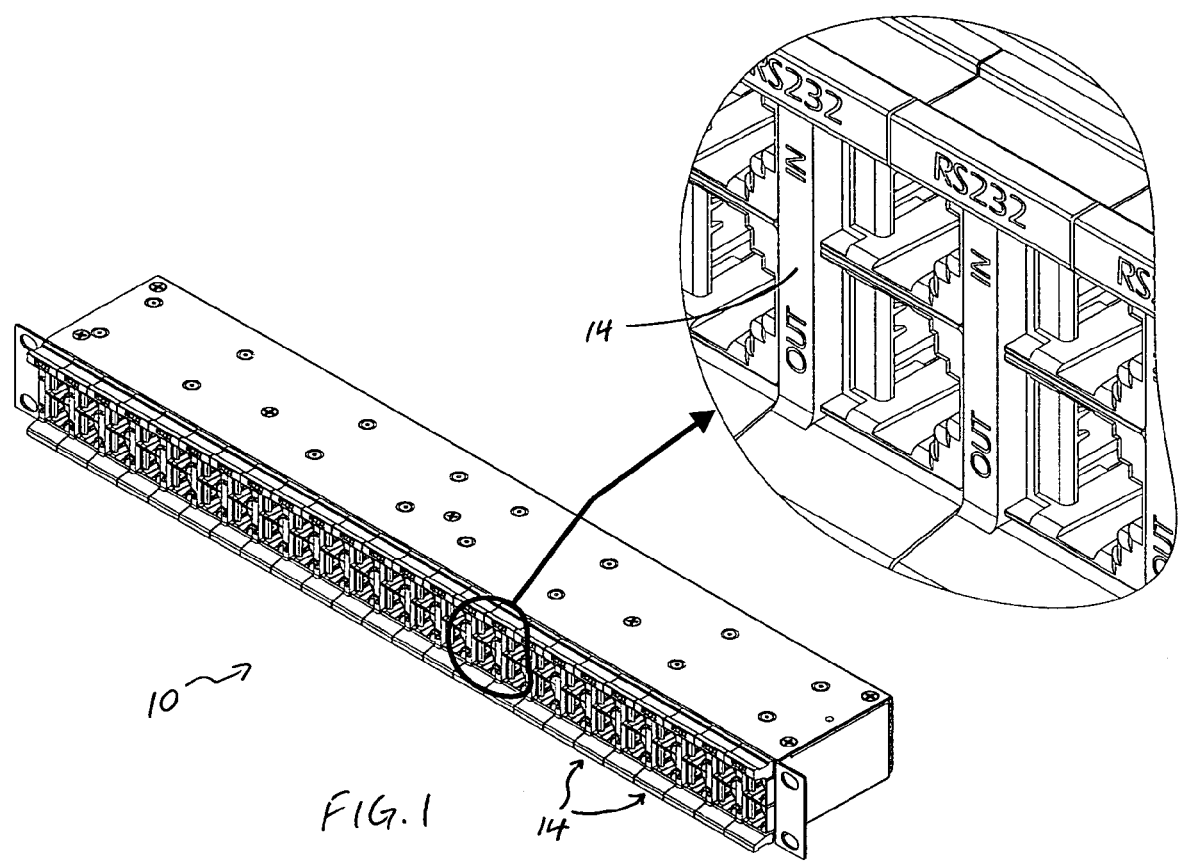
FIG. 1 is a perspective view of a surge protection system.
Figure 2:
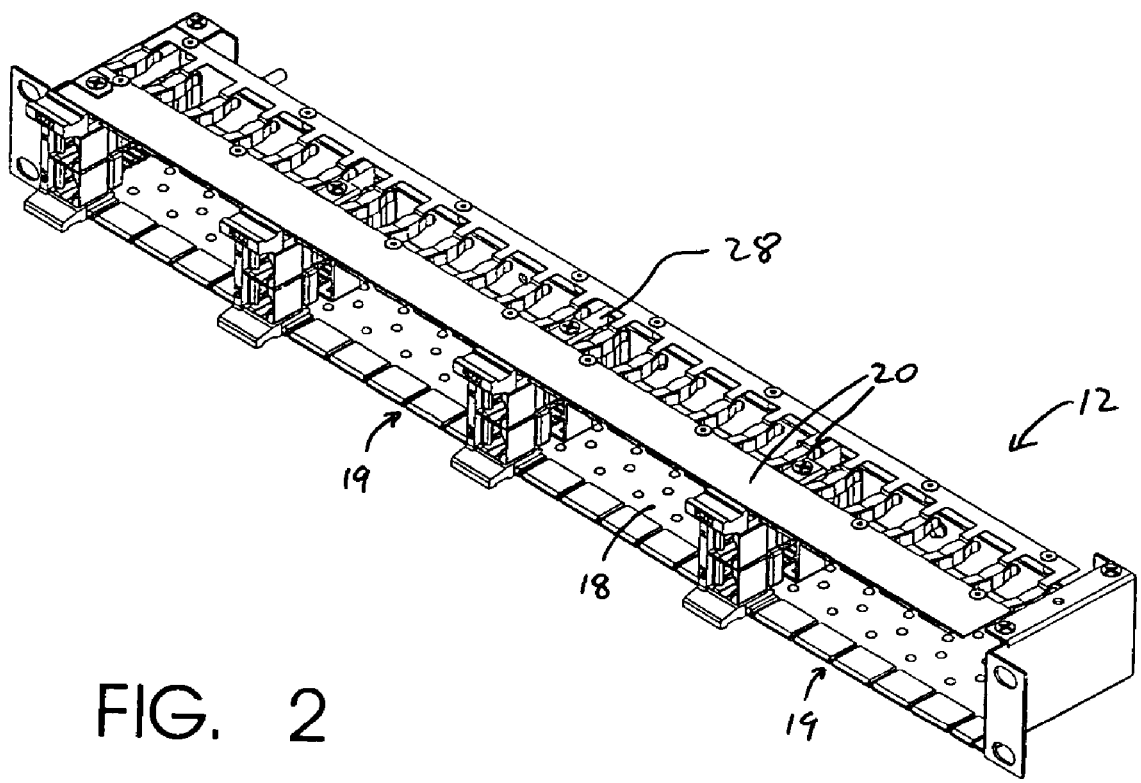
FIG. 2 is a perspective view of a chassis and several modules of the system shown in FIG. 1, without an upper bracket of the chassis.
Figure 3:
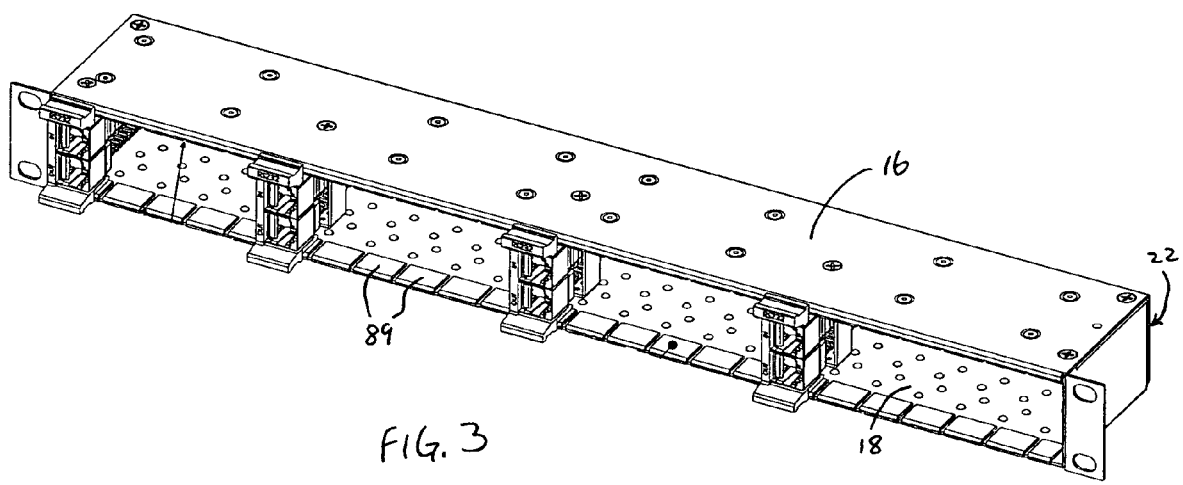
FIG. 3 is a perspective view of the chassis and several modules of the system shown in FIG. 1, with the upper bracket of the chassis.

Referring to FIGS. 1-3, a surge protection system 10 includes a chassis 12, and multiple replaceable surge-protection modules 14. The system 10 is configured to provide surge protection for a variety of different data lines. The system 10 provides a conduit for connecting two cables that are part of a data line, with the conduit transmitting data substantially unaffected through the modules 14 in the absence of a surge on the data line, and interrupting transmission in response to a surge on the data line. A depth of the system 10 with the modules 14 installed may be relatively small, e.g., about 3.25".

Figure 4:
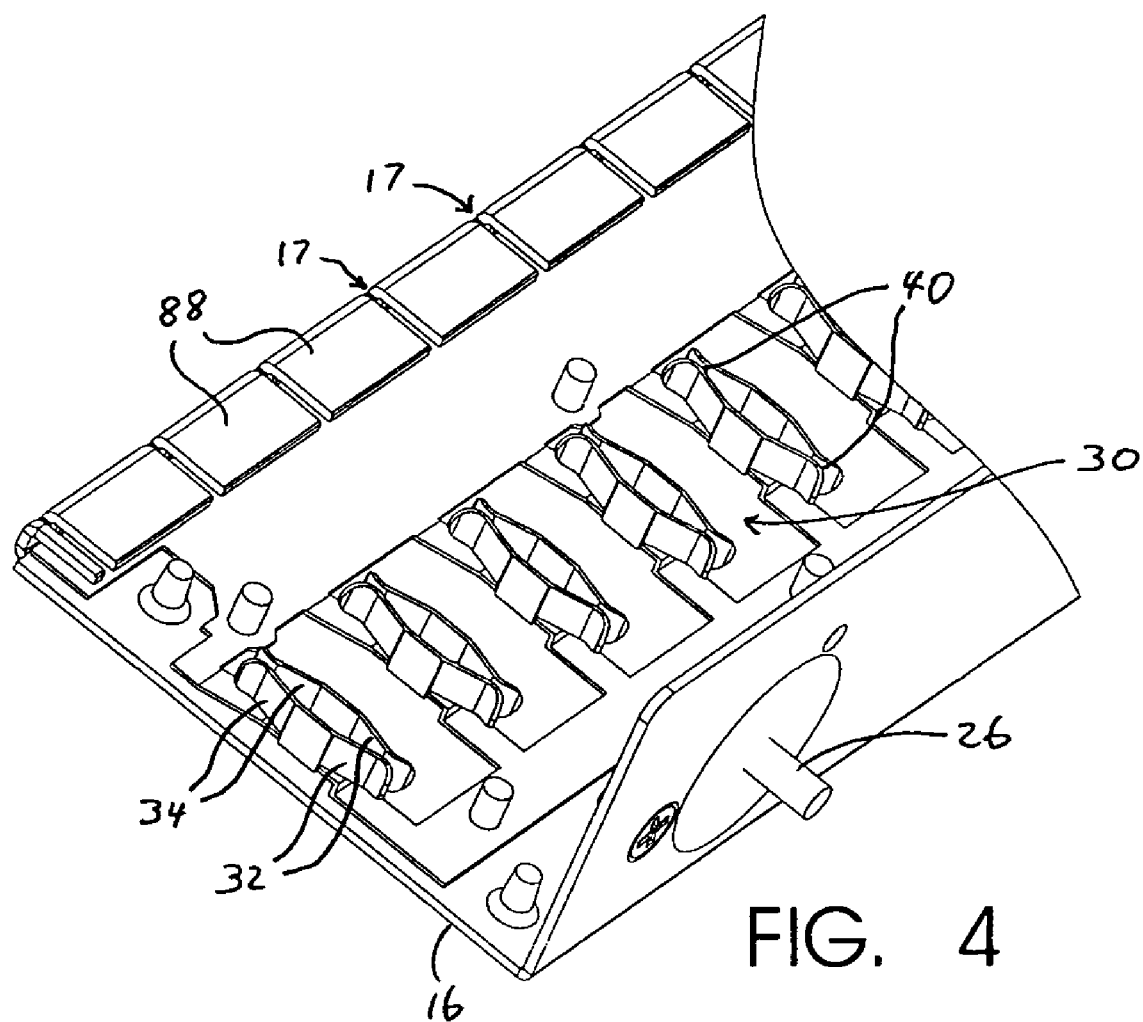
FIG. 4 is a perspective view portions of the upper bracket of the chassis and of a ground buss assembly.
Figure 5:
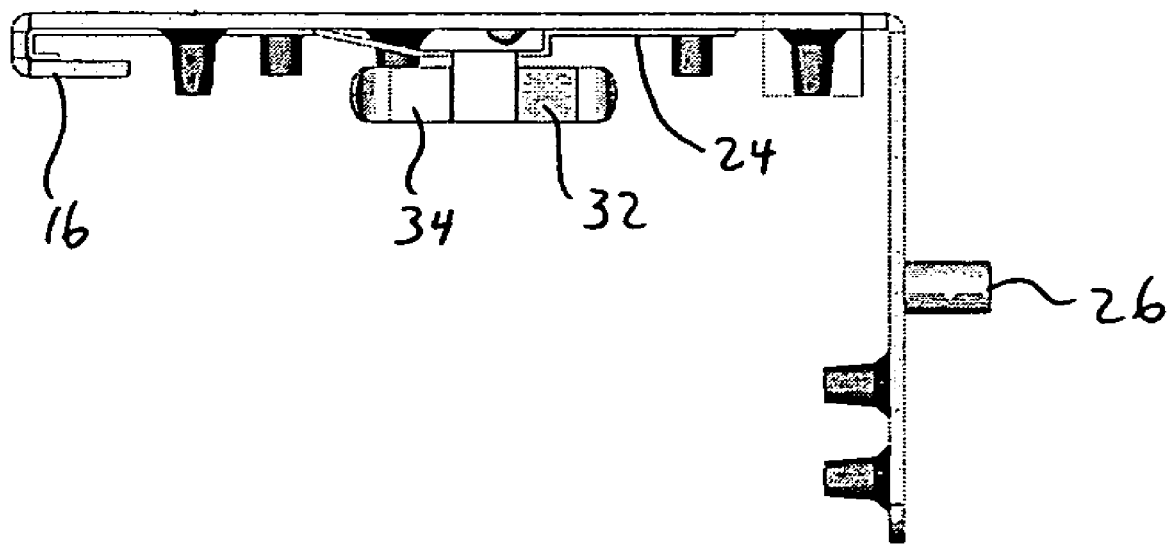
FIG. 5 is a side view of the upper bracket and ground buss assembly.
Figure 6:
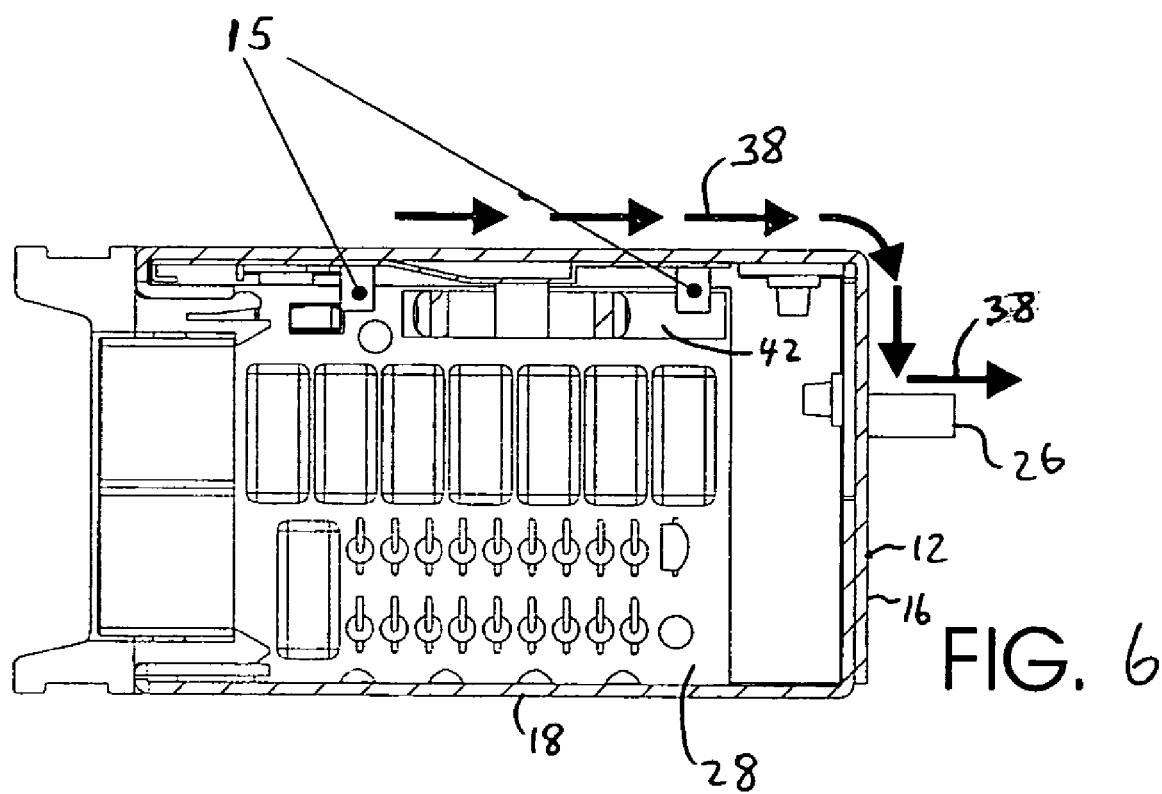
FIG. 6 is a side view of the chassis with a module disposed in the chassis.

Referring also to FIGS. 4-6, the chassis 12 includes an upper bracket 16, and a lower bracket 18. As shown, the upper bracket 16 is L-shaped and the lower bracket 18 is U-shaped, although other shapes could be used. An interior grounding buss assembly 20 is mechanically and electrically attached to the upper bracket 16. The brackets 16, 18, and the buss assembly 20 are made of electrically conductive materials, e.g., metal such as steel, although the brackets 16, 18 are preferably covered with an insulating coating. The lower bracket 18 is mechanically coupled to the upper bracket 16, e.g., by screws through overlapping portions of the brackets 16, 18 at a rear 22 of the chassis 12. The upper bracket 16 is mechanically and electrically coupled to the grounding buss assembly 20 with metal connectors, e.g., aluminum rivets 15.

The upper bracket 16 is mechanically and electrically coupled to a grounding stud 26. The stud 26 is connected to the bracket 16 through a low-impedance connection and is made of an electrically conductive material, e.g., steel. The stud 26 is configured and disposed (here at the rear of the chassis 12) to be accessed with the chassis 12 intact and to be connected to an external grounding mechanism, e.g., a ground wire. The stud 26 may be threaded and screwed into the upper bracket 16. An area of a surface of the upper bracket 16 close to the stud 26, e.g., within about a 0.5-inch radius of the center of the stud 26, is preferably not painted and is free of powder coating. This area may be passivated with an electrically-conductive material such as chromate. Other materials for the stud 26 and/or techniques for connecting the stud 26 to the upper bracket 16 could be used. Additionally, the stud 26 could be an integral part of the upper bracket 16 (i.e., the bracket 16 and the stud 26 could be portions of a monolithic piece).

The upper and lower brackets 16, 18 provide respective slots 17, 19 configured and disposed for guiding a circuit board 28 in between sets 30 of bias members 32, 34 of the buss assembly 20. Hems 88, 89 of the brackets 16, 18 are separated from each other and folded over to provide the slots 17, 19. The slots 17, 19 are configured to be slightly wider than a thickness of the circuit board 28 to allow the board 28 to slide within the slots 17, 19, while directing the board 28 toward the sets 30 of bias members 32, 34. The bias members 32, 34 are electrically and mechanically coupled to the upper bracket 16. The bias members 32, 34 may be made of copper and/or may be coated with electrically conductive material such as nickel. The bias members 32, and the bias members 34, of each set 30 are configured with flared ends that are biased against each other, but with tips separated from each other due to the flaring. The flaring of the members 32 helps allow the members 32 to receive the circuit board 28 inserted between the members 32, as guided by the slots 17, 19. The flaring of the members 34 helps allow the circuit board 28 to be removed from between the members 34. The members 32, 34 are biased toward each other to press against the circuit board 28 while the board 28 is disposed between the members 32, 34 to provide electrical contact between the members 32, 34 and the board 28 and to mechanically retain/stabilize the board 28. The sets 30 provide electrical conductivity from contact portions 40 where the members 32, 34 contact the circuit board 28 to the buss bar assembly 20 attached to the upper bracket 16, thus providing electrical continuity from the board 28 to the ground pin 26 as illustrated in FIG. 6 by arrows 38.

Figure 7:
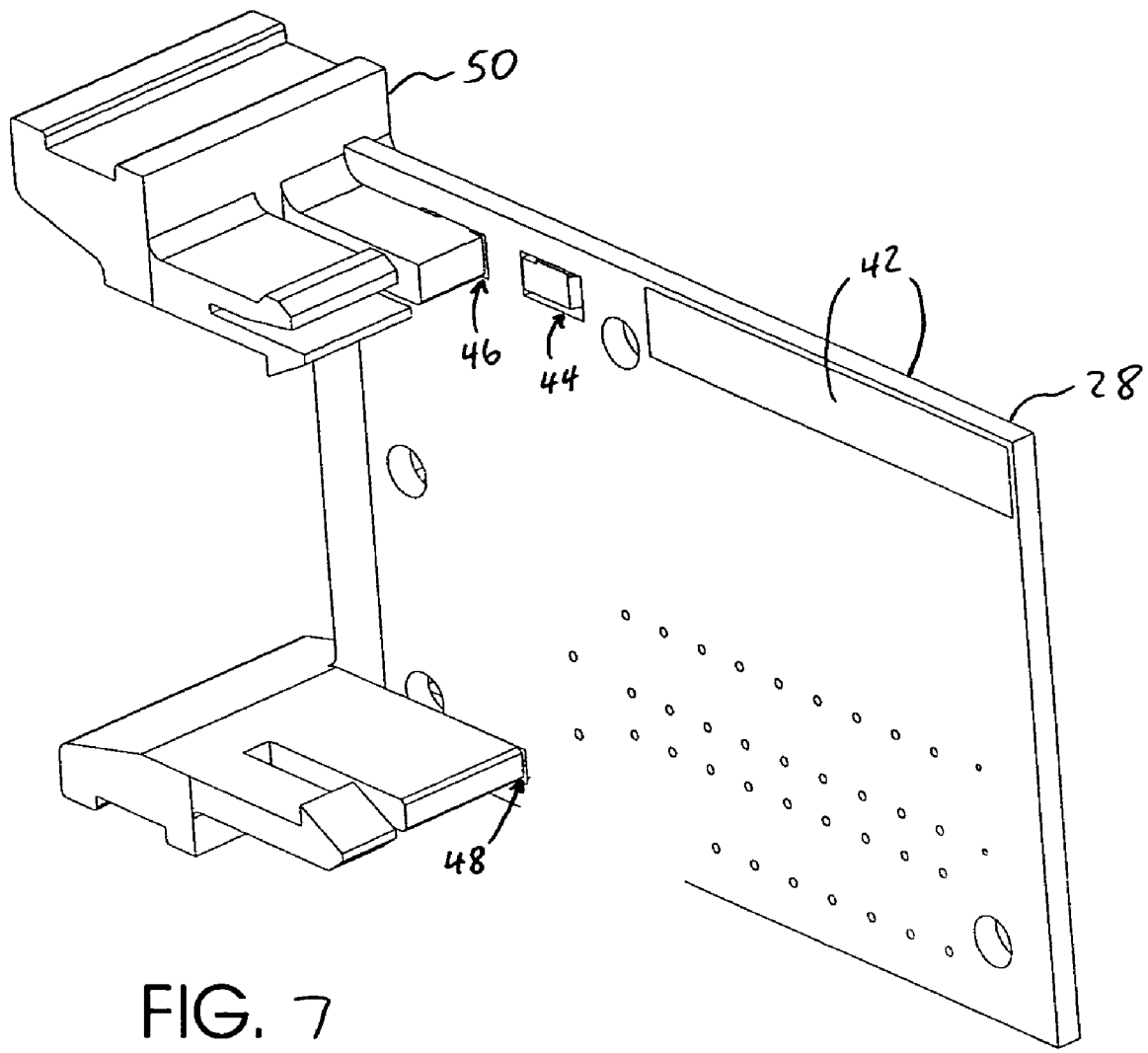
FIG. 7 is a rear perspective view of a circuit board and a bezel.

Referring also to FIG. 7, the modules 14 include the printed circuit boards (PCB) 28. The circuit boards 28 can vary from module to module to provide surge protection for different types of data lines. The circuit boards 28 include electrically-conductive ground contacts 42. The ground contacts 42 are strips of metal, e.g., gold-plated portions of copper cladding of the board 28, disposed on either side of the board 28 and extend along a direction of insertion of the boards 28 into the chassis 12. Preferably, the ground contacts 42 are long enough, e.g., one inch or more, such that the bias members 32 and the bias members 34 touch the contacts 42 with the board 28 inserted into the chassis 12. In other words, the contacts 42 preferably are at least as long as a distance from the contact portions 40 of the bias members 32 to the contact portions 40 of the bias members 34. The contacts 42 are configured to help maintain contact between the bias members 32, 34 and the ground contacts 42 if the module 14 is pulled (e.g., accidentally) slightly from the chassis 12. The PCBs 28 provide slots or holes 44, 46, 48 for use, as described below, in coupling the PCBs 28 to bezels of the modules 14.

Figure 8:
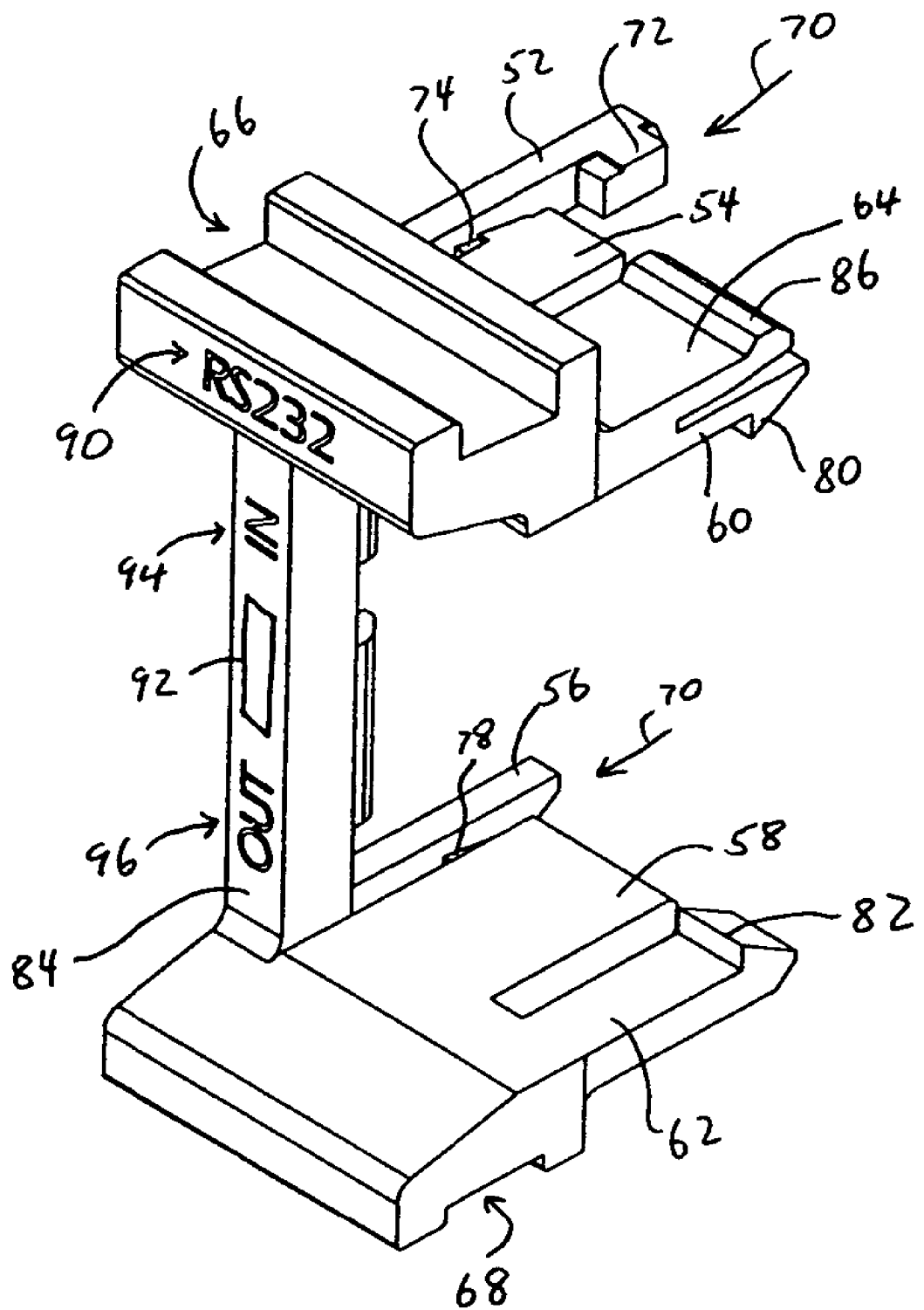
FIG. 8 is a front perspective of a bezel.
Figure 9:
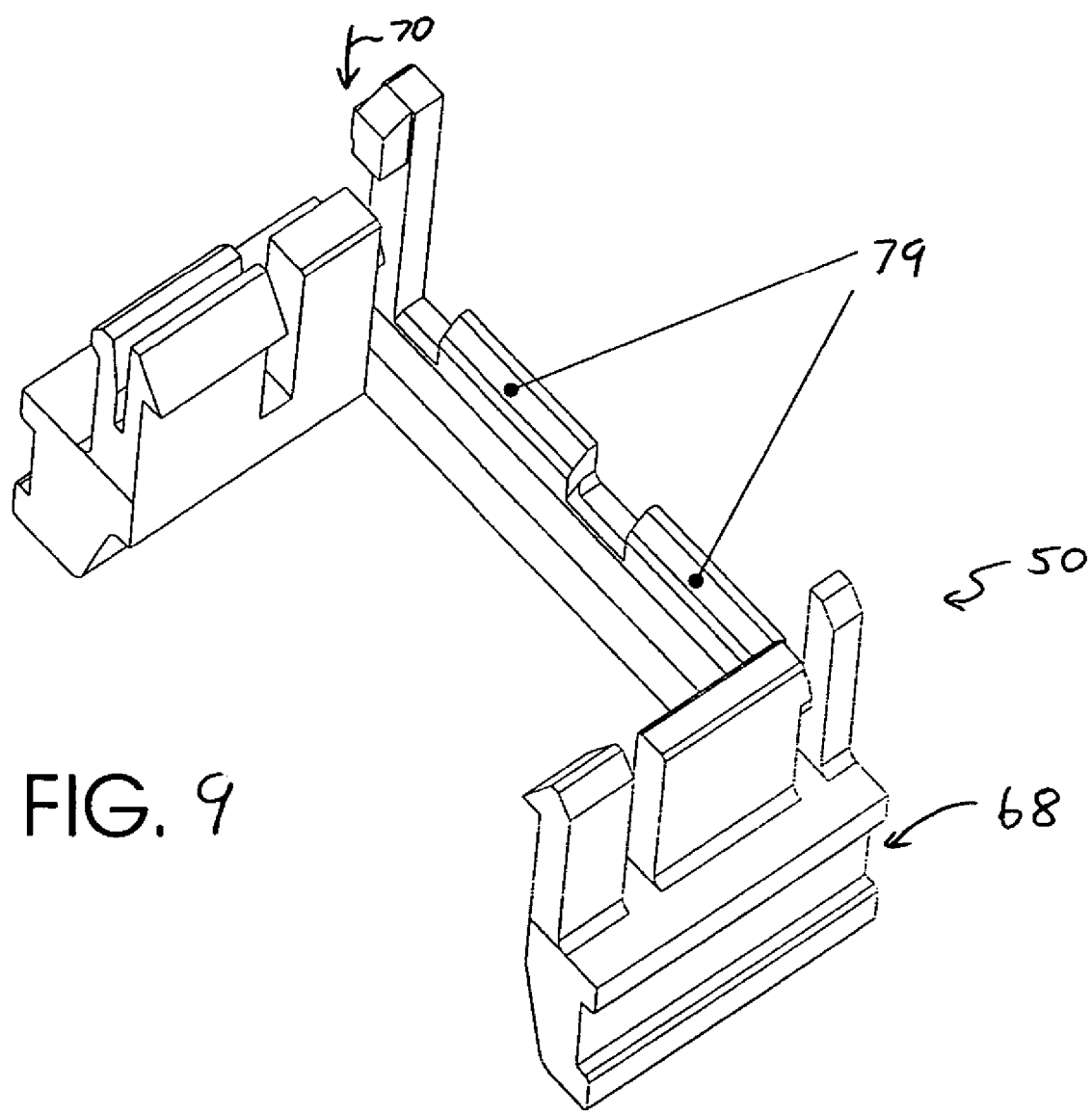
FIG. 9 is a rear perspective view of a bezel.
Figure 10:
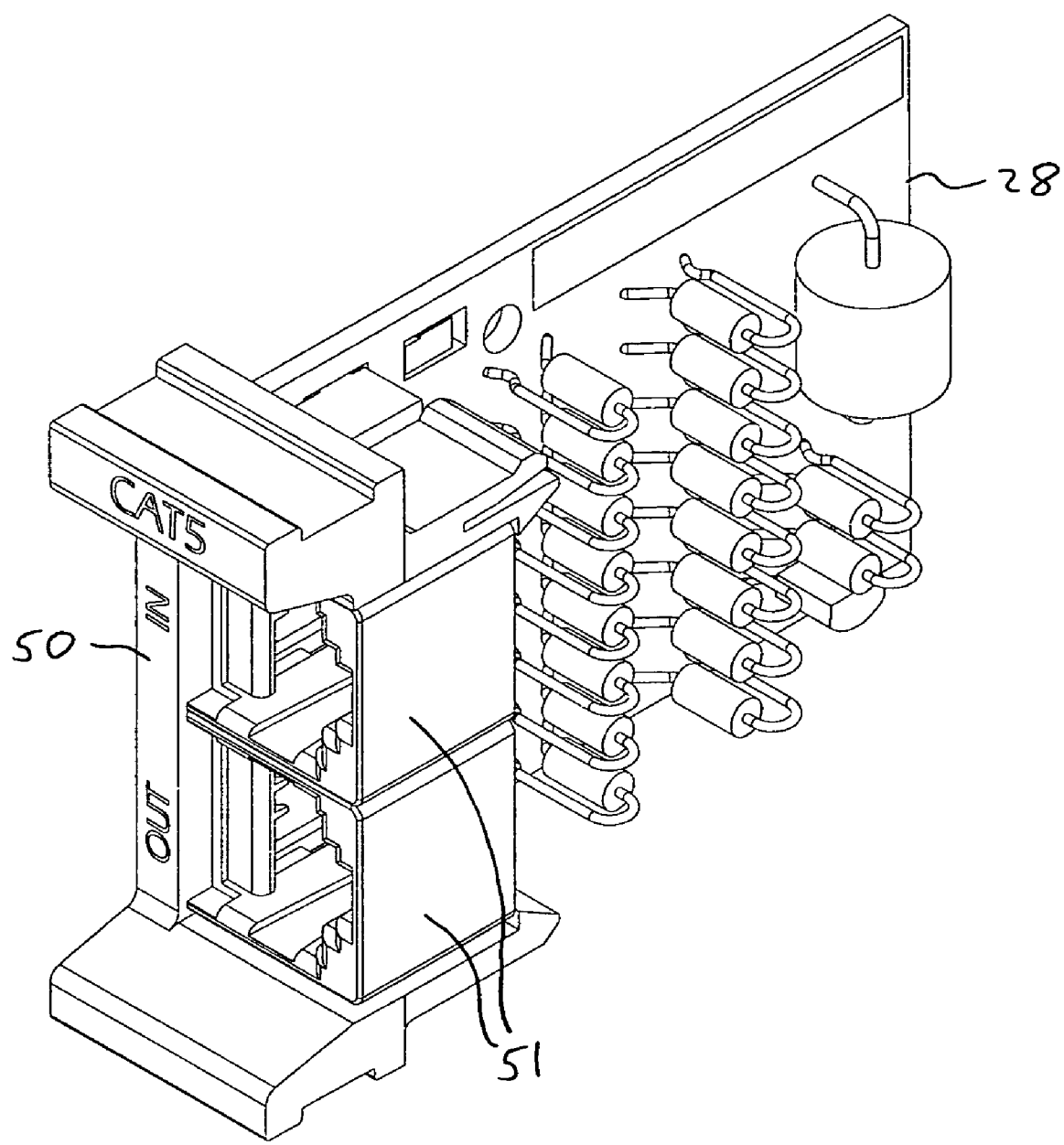
FIG. 10 is a front perspective view of a bezel and a circuit board.
Figure 11:
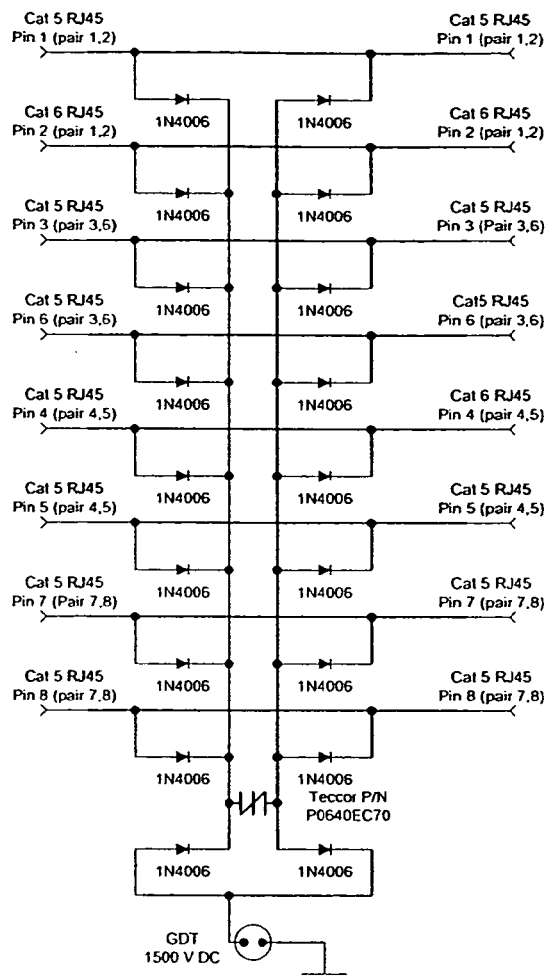
FIGS. 11-14 are circuit diagrams of surge protection circuitry.
Figure 12:
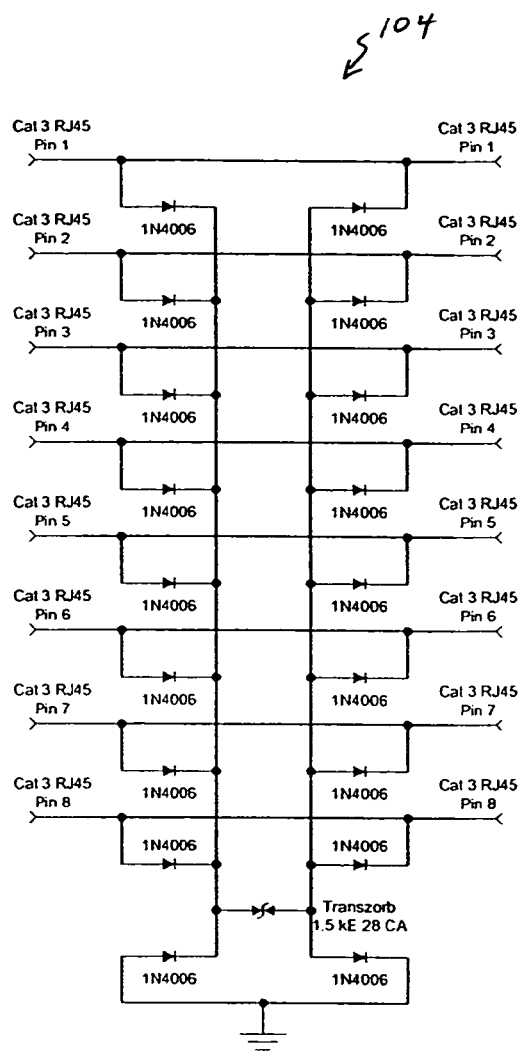
Figure 13:
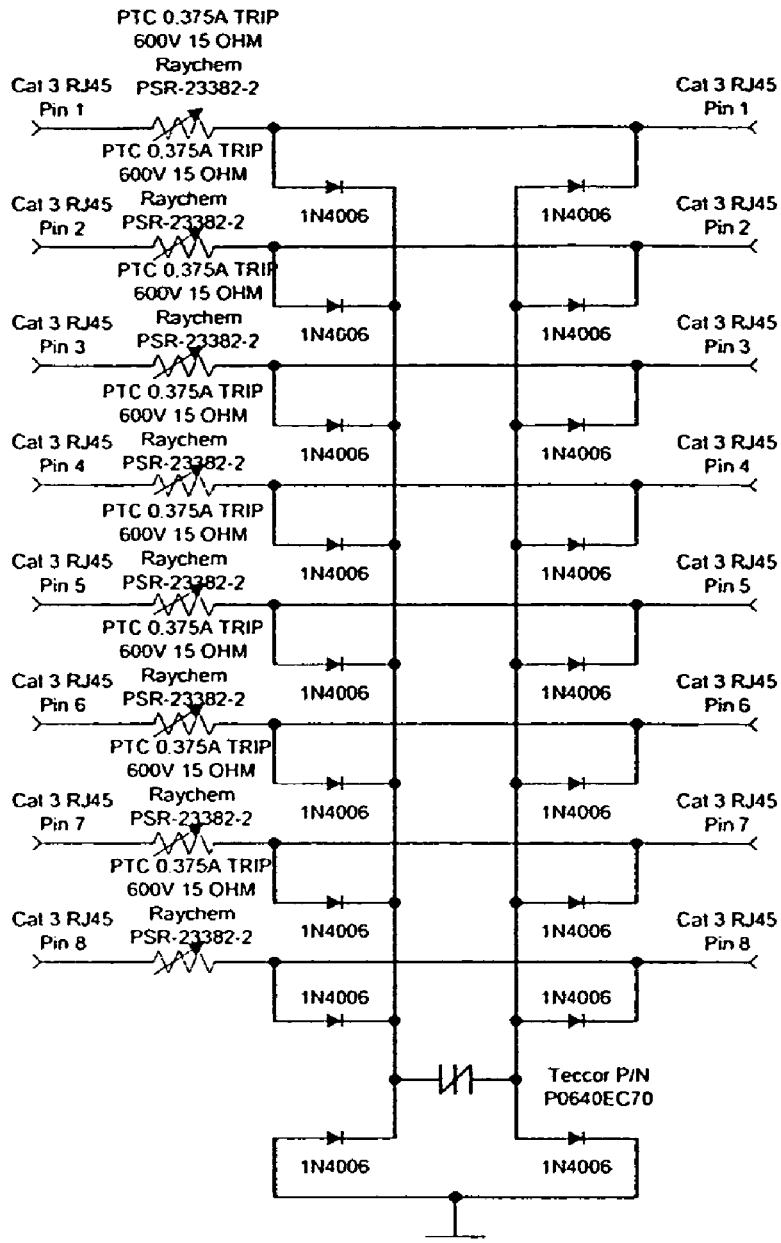
Figure 14:
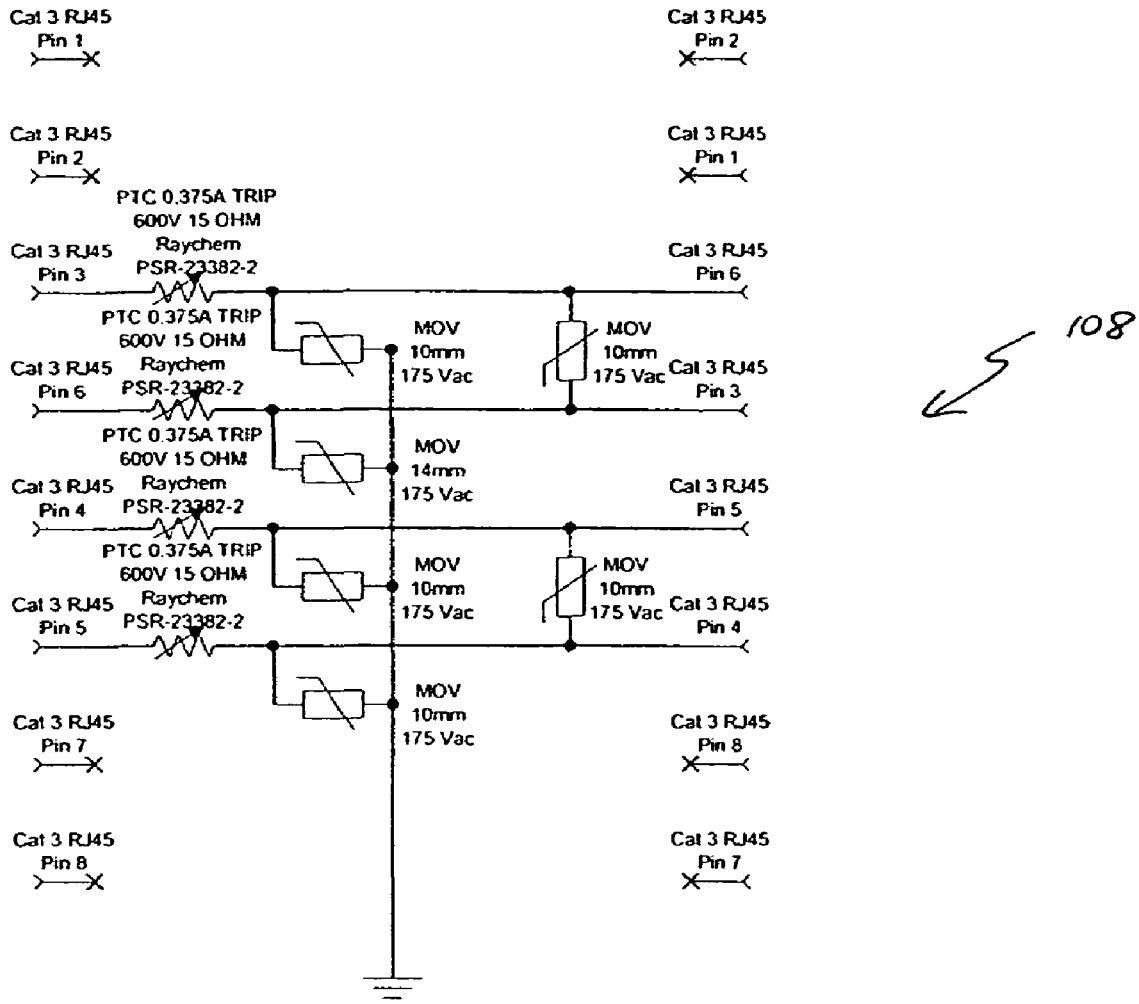
Figure 15:
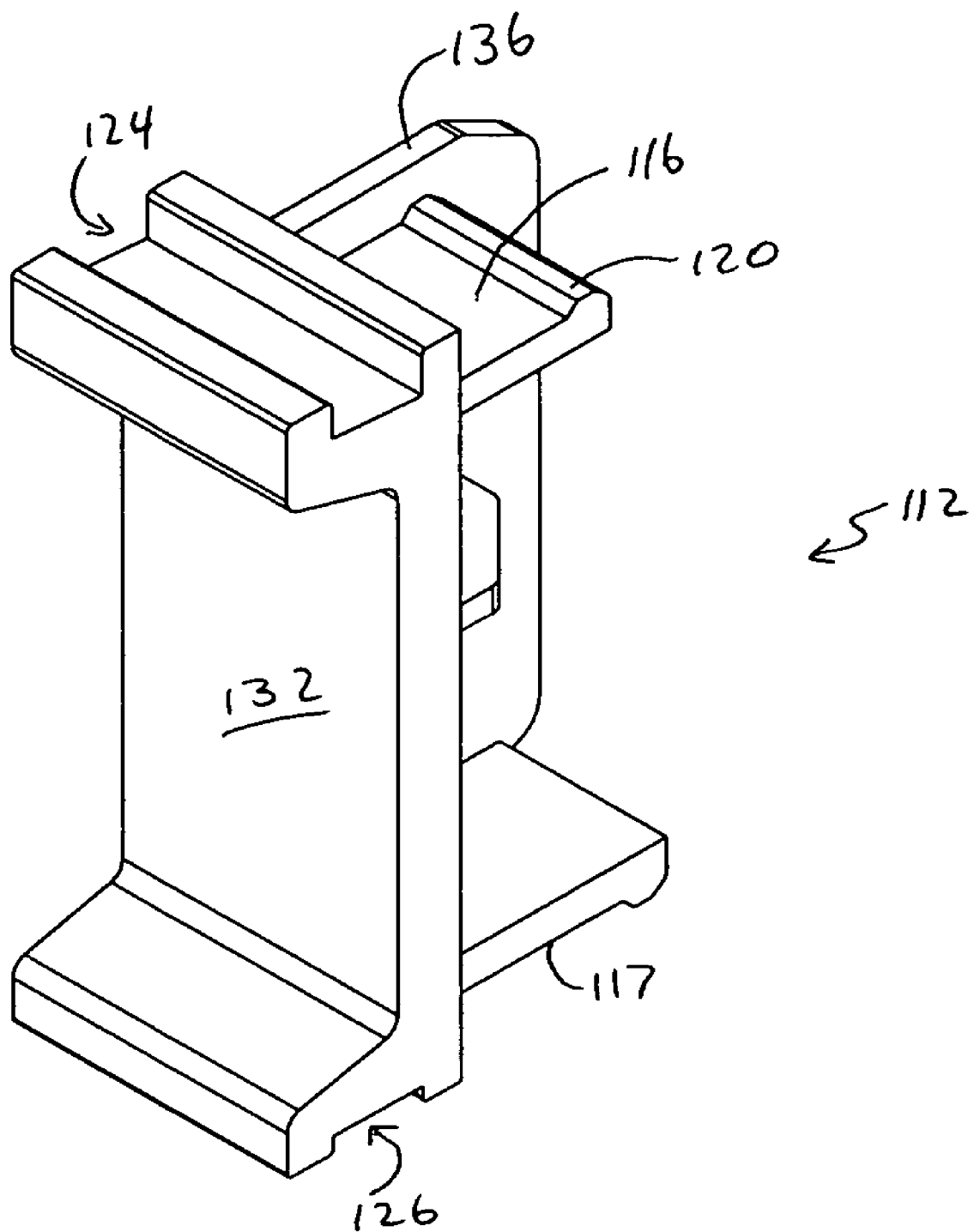
FIGS. 15-16 are front perspective views of one-channel and four-channel blanks, respectively.
Figure 16:
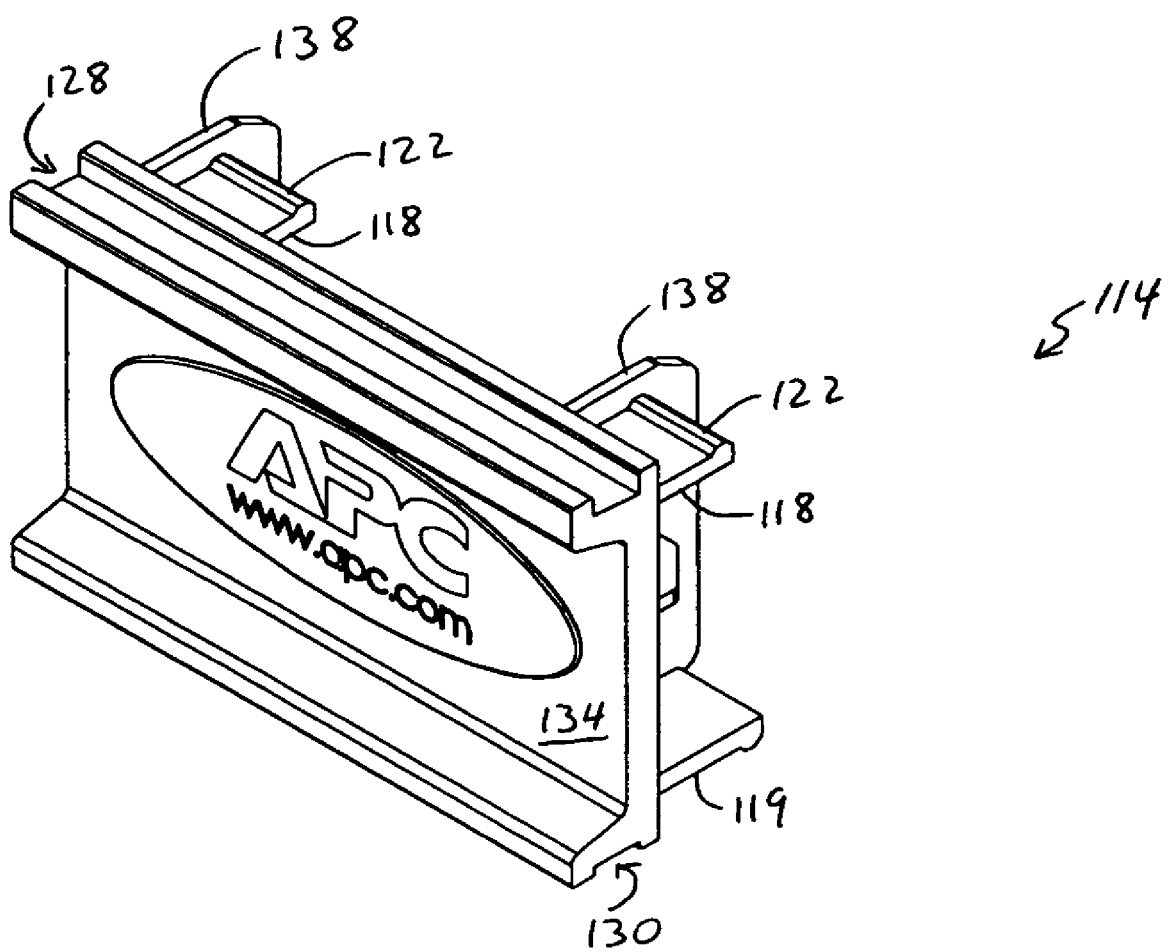

Referring also to FIGS. 8-10, each module 14 includes a bezel 50. The bezel 50 is configured to receive and hold the circuit board 28, receive and hold a pair of connector sockets 51, and to be inserted into the chassis 12 to help retain the module 14 within the chassis 12 while allowing the module 14 to be removed from the chassis 12. The sockets 51 are preferably configured as a pair or set but may be configured as individual sockets.

Referring in particular to FIGS. 8-9, the bezel 50 includes circuit board retention arms 52, 54, 56, 58 configured and disposed to help retain the circuit board 28 in the bezel 50. The bezel 50 is preferably made of a non-conductive material such as plastic (e.g., ABS, PC (polycarbonate), etc.). The upper board retention arms 52, 54, and the lower board retention arms 56, 58 are separated by less than the width of the circuit board 28. The arms 52, 54, 58 are flexible but resilient and have angled surfaces such that as the circuit board 28 is inserted along a direction indicated by arrows 70 the arm 52 will deflect outwardly and the arms 54, 58 will deflect inwardly, away from the circuit board 28. The arms 52, 54 have respective tabs 72, 74, and the arm 58 has a respective tab 78, disposed and configured to fit into the holes 44, 46, 48, respectively in the circuit board 28. The tabs 74, 78 are triangularly shaped to help retain the board 28 in association with the bezel 50. The arm 56 does not have a tab (although it could, with the board 28 being configured with a mating hole or recess), but is configured and disposed to help retain the board 28 in position in the bezel 50. The bezel further includes chamfered ridges 79 that are configured to help guide the circuit board 28 into place.

With further reference to FIG. 10, the bezel 50 further includes socket retention arms 60, 62 configured and disposed to help retain the sockets 51 in the bezel 50. The retention arms 60, 62 include tabs/barriers 80, 82 disposed inboard of a front face 84 of the bezel 50 about a depth of the sockets 51. The tabs 80, 82 provide a backstop for the sockets 51 to inhibit the sockets 51 from moving back from the front face 84. The tabs 80, 82 also help with removal of the module 14 from the chassis 12 by pulling on the sockets 51, that may are soldered to the board 28, that is in turn retained by the spring fingers 32, 34.

The bezel 50 further includes a chassis retention arm 64, and provides finger grooves 66, 68 to help retain the bezel 50 in the chassis while allowing the module to be replaceable. The chassis retention arm 64 is flexible and resilient and configured to deflect downwardly when then bezel 50 is inserted into the chassis 12 and contacts the upper bracket 16. In particular, the arm 64 includes an angled (or rounded) tab 86 configured to slide against one or more the hems 88 (FIG. 4) of the upper bracket 16 to cause the arm 64 to deflect away from the hems 88. The arm 64 is configured to spring upwardly once the tab 86 is disposed inboard of the hems 88 to vertically overlap with one or more of the hems 88. This helps to retain the bezel 50, and thus the module 14, in the chassis 12. The tab 86, however, is configured to inhibit, but allow, the bezel 50 to be removed from the chassis 12. Here, the tab 86 is angled (i.e., not rectangular in cross section) to provide a non-vertical surface to the hems 88 for both insertion into and removal from the chassis 12. The tab 86 is preferably shaped such that the bezel 50 may be removed from the chassis 12 by pulling on the bezel 50. The modules 14 are designed to require at least about 1-2 pounds of force, to overcome forces of the bias members 32, 34 holding the board 28 and to overcome the resistance provided by the tab 86, to remove the modules 14 from the chassis 12. To help a person pull on the bezel 50 to remove/replace a module 14, the bezel 50 provides the finger grooves 66, 68 on the top and bottom of the bezel 50 into which a person can insert portions of the person's fingers. The person can grasp and pull on the bezel 50, in particular the walls forming the grooves 66, 68, to insert the bezel 50 into, or remove the bezel 50 from, the chassis 12.

The bezel 50 preferably includes various indicia for identifying the type of module 14 and the use of the sockets 51. As shown in FIG. 8, the bezel 50 includes a type label 90 indicating the type of module. The label 90 may be alphanumeric and/or use other symbols, is preferably in a color that contrasts with the bezel color (and/or recessed or raised relative to surrounding area of the bezel 50), and may be of a color that depends on, and indicates, the type of module. The bezel 50 may also include a separate color-coded label 92 whose color is associated with the type of module. For example, the label 92 could be yellow for P232R modules, grey for PTEL2R modules, white for PDIGTR modules, green for PNETR5 modules, red for PNETR6 modules, although these color combinations are exemplary only and not limiting of the invention. Further, the bezel 50 preferably has socket-use labels 94, 96 indicating whether the socket 51 should be used for incoming or outgoing data.

The modules 14 include the sockets 51 for connecting with mating data line connectors. The sockets 51 are preferably-RJ-45 sockets, although other socket types are acceptable. The sockets 51 are preferably of the same type, with the different types of modules 14 being determined/dictated by the type of circuit board 28 used in each of the modules 14. Appropriate modifications to the bezel 50 would be made to accommodate other types of connectors, e.g., providing round holes for "F" connectors.

Referring to FIGS. 11-14, the circuit board 28 includes one of a variety of circuits 102, 104, 106, 108 depending upon the type of data line to be connected to the respective module. The circuit 102 is for use with a PNETR5 module for CAT 5 network protection for voice over IP (VoIP) data lines. The circuit 104 is for use with a P232R module for RS232 serial communications. The circuit 106 is for use with a PDIGTR module for digital telephony. The circuit 108 is for use with a PTEL2R module for telephone and ISDN communications. Each of the circuits 102, 104, 106, 108 is configured to provide surge protection for any portion of the data line coming into the respective module 14, e.g., any pin in the sockets 51. The circuits 102, 104, 106, 108 are configured to disconnect an input pin from its corresponding output pin in response to a high-voltage (e.g., over 60V for ISDN, over 175V for telephone lines), overcurrent condition (e.g., over 500 mA).

Referring to FIGS. 1-2 and 15-16, unused positions in the chassis 12 may be filled with blanks 112, 114. The blanks 112, 114 include upper chassis retention arms 116, 118, with tabs 120, 122. The arms 116, 118 are configured similarly to the arm 64 shown in FIG. 8. The blanks 112, 114 also have lower chassis retention arms 117, 119 configured similarly to the arms 116, 118, including tabs 121, 123, although the arms 117, 119 as shown are longer than the arms 116, 118 to accommodate longer hems 89 on the lower bracket 18 than on the upper bracket 16. The blanks 112, 114 are configured to be inserted into and retained in the chassis 12 like the bezel 50. The blanks 112, 114 provide finger grooves 124, 126, 128, 130 for a person to use to grasp and pull the blanks 112, 114 from the chassis 12. Thus, the blanks 112, 114 are removable and can replace, or be replaced by, one or more of the modules 14. As shown, the blank 112 is a one-channel blank configured to fill a single position (i.e., take the place of a single bezel 50) in the chassis 12 and the blank 114 is a four-channel blank configured to fill four positions in the chassis 12, although other sizes of blanks could be used. Further, the blanks 112, 114 include solid front faces 132, 134 that inhibit insertion of items, such as a person's finger, into the chassis 12. The blanks 112, 114 further include walls 136, 138 having widths approximately the same as the circuit boards 28 (FIG. 7). The walls 136, 138 are sized and disposed to fit within the slots 17, 19 in the chassis 12.

Figure 17:
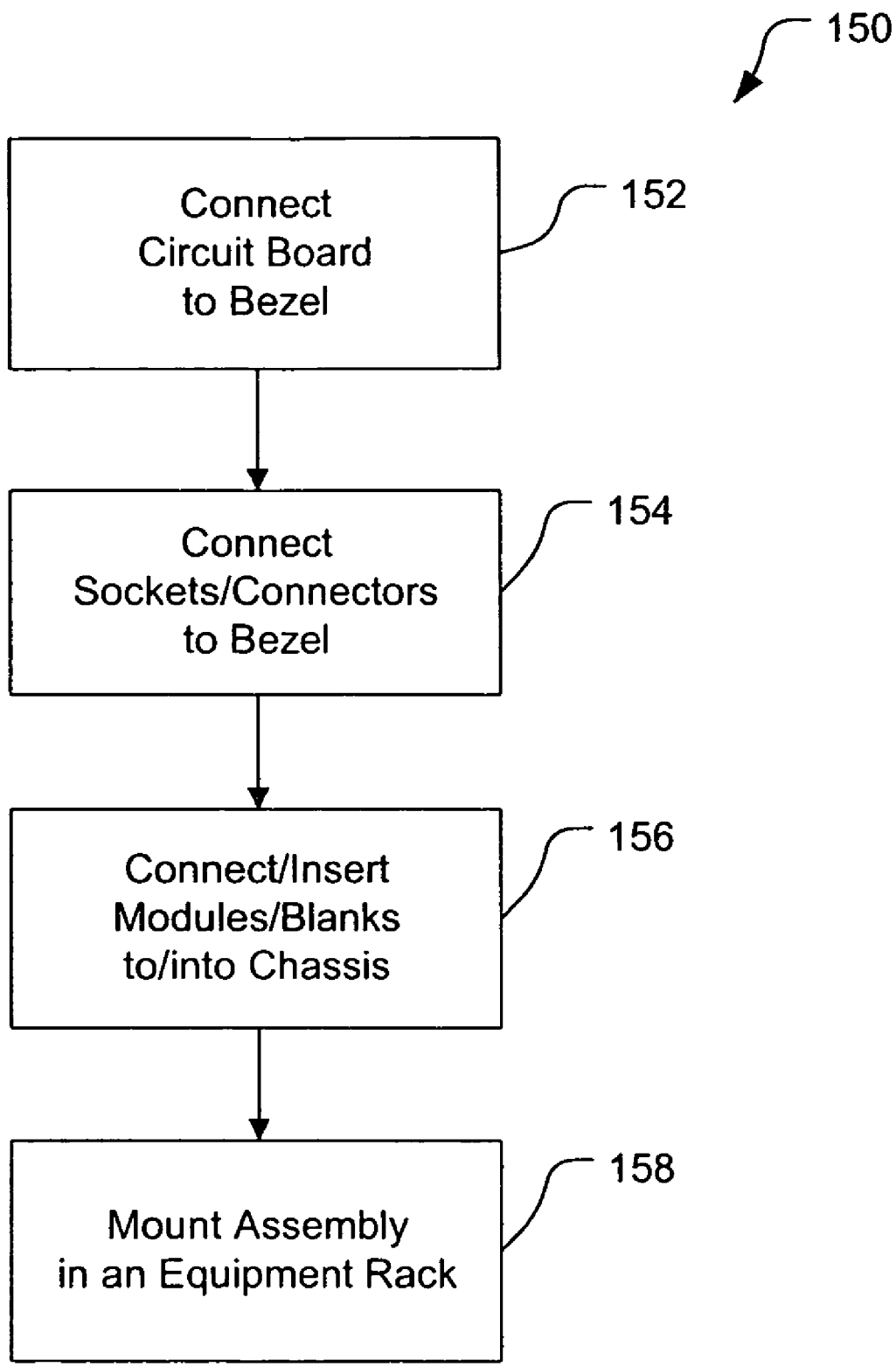
FIG. 17 is a block flow diagram of a process of assembling the system shown in FIG. 1.

Referring to FIG. 17, with further reference to FIGS. 1-14, a process 150 for assembling and installing the system 10 includes the stages shown. The process 150, however, is exemplary only and not limiting. The process 150 may be altered, e.g., by having stages added, removed, or rearranged.

At stage 152, the circuit board 28 for a desired module 14 is connected to the corresponding bezel 50. The corresponding bezel 50 preferably has visual indicia of the type of module 14 corresponding to the type of circuit board 28 being connected to the bezel 50. The board 28 is inserted between the upper board retention arms 52, 54 and the lower board retention arms 56, 58. As the board 28 is inserted, the board 28 slides against the tabs 72, 74, 74 causing the arm 52 to deflect outwardly and the arms 54, 58 to deflect inwardly, away from the board 28. When the slots 46, 44, 48 reach the tabs 72, 74, 78, the arms 52, 54, 58 spring inwardly and outwardly, respectively, to push the tabs 72, 74, 78 into the slots 44, 46, 48 to help retain the board 28 in relation to the bezel 50, inhibiting separation and making the bezel 50 and the board 28 essentially a single unit.

At stage 154, the connectors/sockets 51 are connected to the bezel 50. The sockets 51 are inserted into the front of the bezel 50 until the sockets 51 reach the tabs 80, 82 of the socket retention arms 60, 62. The sockets 51 may be held/retained in place, e.g, by having expandable pins fit into mating receptacles/holes provided in the circuit board 28. Stage 154 may be incorporated into stage 152, e.g., if the connectors 51 are connected, e.g., soldered, to the circuit board 28 before connection to the bezel 50.

At stage 156, the modules 14 and/or the blanks 112, 114 are connected to the chassis 12 as desired. Desired types and quantities of the modules 14 are inserted into the chassis 12 at desired locations/positions provided by the chassis 12. Each module 14 is pushed into the chassis 12 with its circuit board 28 being guided into the chassis by corresponding ones of the slots 17, 19. The chassis retention arm 64 deflects downward as the chassis retention arm tab 86 interferes with the corresponding hem 88. The module 14 is inserted until the chassis retention arm tab 86 reaches inside of the hem 88 of the upper bracket 16 and the retention arm moves upwardly such that the tab 86 will interfere with the ledge or lip of the hem 88 to inhibit removal (especially accidental, unintentional removal) of the module 14. The circuit boards 28 are simultaneously inserted between the bias members 32, 34 such that the ground contacts 42 make electrical contact with at least some of, and preferably all of, the bias members 32, 34 (spring fingers), with the spring bias of the members 32, 34 helping to maintain this contact. Blanks 112, 114 are similarly inserted into desired positions in the chassis 12, with the circuit board simulating walls 136, 138 being guided into the chassis by the slots 17, 19 and the chassis retention arms 116, 117, 118, 119 deflecting and returning to their normal positions such that the tabs 120, 121, 122, 123 help guard against removal of the blanks 112, 114. Preferably, all of the positions available for modules in the chassis 12 are filled with either a module 14 or a blank 112, 114.

At stage 158, the system 10 is installed in an equipment rack. The system is placed into a rack and mounted to the rack by screwing screws though holes provided in flanges on either end of the chassis 12 (see FIGS. 1-2).

Figure 18:
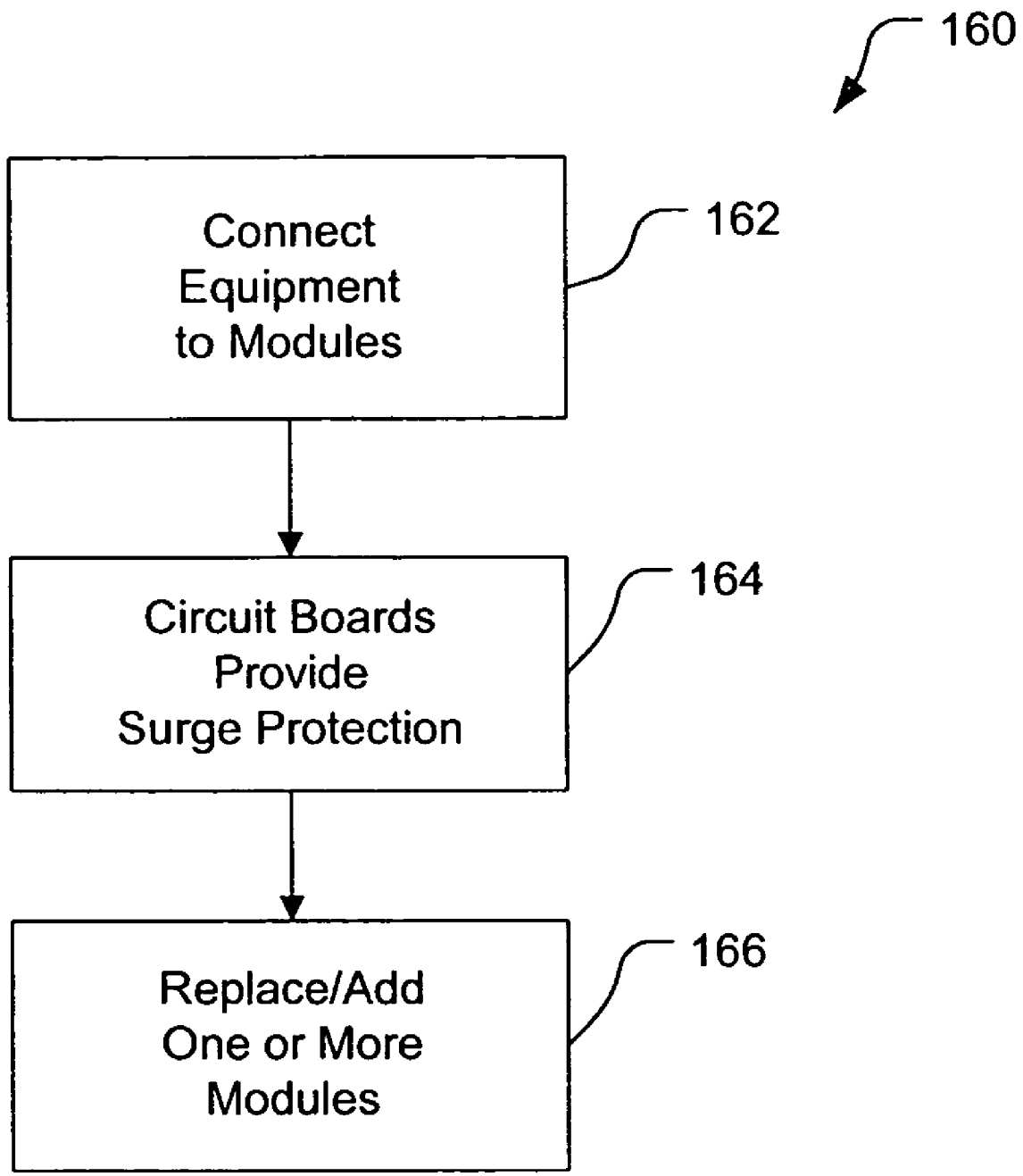
FIG. 18 is a block flow diagram of a process for providing surge protection using the system shown in FIG. 1.

In operation, referring to FIG. 18, with further reference to FIG. 1-14, a process 160 for providing surge protection using the system 10 includes the stages shown. The process 160, however, is exemplary only and not limiting. The process 160 may be altered, e.g., by having stages added, removed, or rearranged.

At stage 162, appropriate equipment is connected to corresponding modules 14. Inbound data lines are connected to the IN sockets 51 of the modules 14 and data lines are coupled from the OUT sockets 51 to appropriate equipment (e.g., phone switches, data switches, routers, hubs, etc.).

At stage 164, the circuit boards 28 provide surge protection to the various lines. If a surge is received, the circuitry (e.g., the circuit 102, 104, 106, 108) inhibits the surge from reaching the receiving equipment (e.g., the switch).

At stage 166, a module 14 is replaced or added. Modules 14 can be added by replacing one or more of the blanks 112, 114 with one or more desired modules 14. Further, one type of module can replace another type of module. Also, any module(s) 14 that protected the downstream equipment and is now incapable of further providing a data pass through with surge protection, or any module 14 that fails, can be replaced. To add a module 14, a blank 112, 114 is removed by grabbing and pulling the blank 112, 114 from the chassis. The module 14 to be added is grabbed (e.g., using the finger grooves 66, 68) and pushed into the chassis 12, with the board 28 being guided into the chassis 12 by the slots 17, 19 and the contact pads 42 fitting between the spring bias members 32, 34. Appropriate data lines are connected to the IN and OUT sockets 51. If a single module 14 is added but a multi-position blank 114 was removed, one or more single-position blanks 112 can be inserted into the chassis 12 to fill the newly open positions. To replace one module 14 with another, the presently-connected data lines are removed, the existing module 14 is grabbed, e.g., by the finger grooves 66, 68 and pulled from the chassis 12, the new module 14 is pushed into its place, and the data lines reconnected to the new module 14. Alternatively, the new module 14 can be inserted into the chassis 12, or may already reside in the chassis 12, and the data lines are disconnected from the old module 14 and connected to the new module 14. The old module 14 can then be removed and replaced, e.g., with another module 14 of the same or different type, or with a blank 112.

Figure 19:
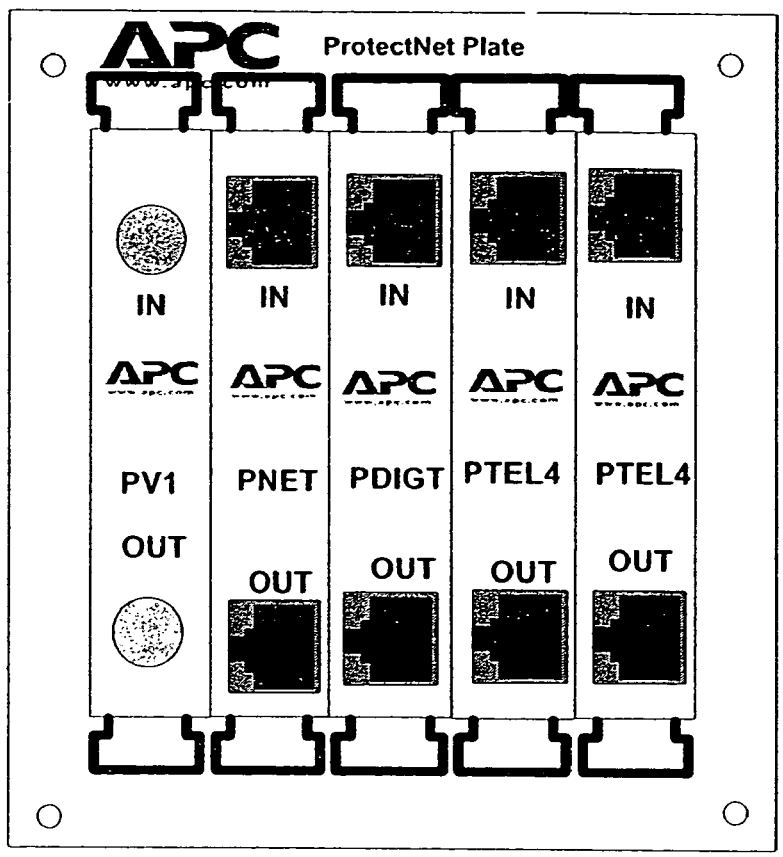
FIGS. 19-20 are front views of surge protection systems with various connector modules.
Figure 20:
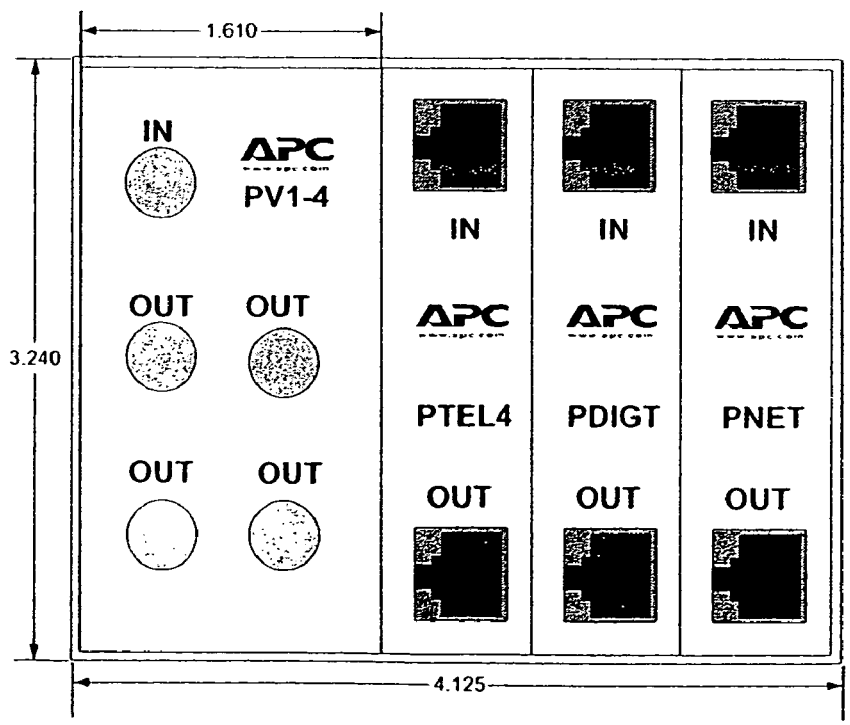

Other embodiments are within the scope of the invention. For example, instead of or in addition to the slots 17, 19 for guiding the modules 14 into place in the chassis 12, raised ridges, or bumps, etc. may be used as guides. Further, surge-protection modules may be provided for use other than in a rackmounted environment. Replaceable surge-protection modules may be provided for small office applications and/or home electrical boxes (e.g., circuit-breaker boxes). For example, such a system could have four to six channels with each channel being one module width of approximately 0.7". Referring to FIGS. 19-20, additional modules for these applications could include a single-channel CATV surge protector using circular-port "F" connectors, or a four-channel CATV splitter with surge protection using "F" connectors in a double-width module of approximately 1.4". The dimensions discussed, and the dimensions shown in FIG. 20 are exemplary only and not limiting to the invention. Still other arrangements would be acceptable.

Various options are possible for mounting configurations for smaller chassis. For example, a smaller version of the rackmounted chassis with no "ears" could be used. This chassis could be substantially rectangular with tapped screw holes to help the chassis be mounted to a structured wiring chassis wall and have the screws penetrate the chassis. Alternatively, right-angle brackets could be mounted on the side of the chassis at either the top or the bottom to help the chassis be mounted to a desktop or under a benchtop with the modules in a readable position. Alternatively still, the chassis stud could be allowed to penetrate through the back of a structured wiring chassis and provide tapped screw holes for securing the module chassis to the back wall of the structured wiring chassis.

Also, the number of modules 14 and ports in the chassis 12 may be different than that shown and discussed. For example, the chassis 12 could be 2U high and accommodate twice as many modules 14. Further, different sizes of modules 14 could be used such that more than 24 modules could be used in a 1U chassis. Different styles of modules may also be used. For example, the sets 30 of the bias members 32, 34 may not be biased against each other, but configured with their contact portions 40 closer to each other than the thickness of the circuit board 28 to bias against the board 28 when inserted between the members 32, 34.

Further, many variations of techniques for inhibiting/impeding, while allowing, removal of the modules 14 from the chassis 12 may be used. For example, instead of using a flexible arm on the module for engaging and interfering with a stationary portion of the chassis 12, the chassis 12 could include a movable arm and the module 14 could provide a surface, e.g., a ledge or lip, to interfere with the chassis's arm. Further, the module 14 and/or the chassis 12 could include one or more detents (e.g., tabs, or bumps, etc.) with the chassis 12, and/or the module 14 providing a corresponding recess. The detent could be rounded or otherwise angled to interfere with a wall of the recess to provide an inhibiting force that may be overcome by application of sufficient force. With such an arrangement, walls of the module 14 and/or the chassis 12 may flex to allow the module 14 and chassis 12 to slide relative to each other and to urge the detent into the recess when the detent and the recess align. Still other configurations for inhibiting, but allowing, removal of the modules 14 are possible and within the scope of the invention.

What is claimed is:

1. A rack-mountable in-line surge protection system comprising:
   a chassis that mounts to an equipment rack, the chassis including:
   an electrically-conductive buss;
   an electrically-conductive ground member coupled to the buss and that connects to a grounding mechanism with the grounding mechanism received by the ground member; and a plurality of electrically-conductive bias members coupled to the buss; and
   a plurality of surge-protection modules removably inserted into and coupled to the chassis, the modules each including a printed circuit board and first and second receptacles for receiving connectors and coupling the connectors to the circuit board, the circuit boards each including a grounding contact portion and surge protection circuitry that inhibits an electrical surge received at the first receptacle from reaching the second receptacle;
   wherein the circuit boards are disposed between respective bias members when inserted in the chassis, with the grounding contact portion of each circuit board in electrical contact with at least a respective one of the bias members.

2. The system of claim 1 wherein the chassis includes a plurality of guides for guiding the printed circuit boards of the modules into the chassis and in between the bias members.

3. The system of claim 2 wherein the chassis provides slots with walls of the slots serving as the guides.

4. The system of claim 1 wherein the grounding contact portions of the printed circuit boards extend at least as far as a distance between locations where the bias members contact the circuit boards with the modules fully inserted into the chassis.

5. The system of claim 1 wherein at least one of the module and the chassis includes a member for interfering with the other of the module and the chassis with the module received by the chassis to inhibit separation of the module from the chassis.

6. The system of claim 5 wherein each module includes a bias arm for engaging a ledge of the chassis to retain the modules in the chassis.

7. The system of claim 6 wherein the bias arms are configured to deflect in response to a threshold of force being applied to the modules to permit removal of the modules from the chassis.

8. A chassis for use in a rack of electronic data communications equipment and with modules configured for data communications, the chassis comprising:
   a housing that provides a plurality of openings sized and shaped to receive the modules, and that mounts in the rack;
   an electrically-conductive buss coupled to the housing and extending along a length of the housing;
   an electrically-conductive ground member, coupled to the buss, that connects to a grounding mechanism with the grounding mechanism received by the ground member; and
   a plurality of electrically-conductive bias members, coupled to the buss, that directly contact and are biased against grounding contact portions of respective circuit boards of the modules with the modules received by the chassis.

9. The chassis of claim 8 wherein the bias members are disposed in opposing pairs.

10. The chassis of claim 9 wherein two pairs of the bias members are disposed to receive each circuit board.

11. The chassis of claim 8 wherein the housing provides guides for guiding the circuit boards into contact with the bias members.

12. The chassis of claim 11 wherein the housing defines a plurality of slots with the walls of the slots serving as the guides.

13. The chassis of claim 12 wherein the housing defines a top and a bottom slot for each of the circuit boards.

14. A replaceable module for use with a rack-mountable data communications chassis that provides a plurality of openings each configured for receiving the module, the module comprising:
   a circuit board including surge-protection circuitry between an input and an output, wherein the surge-protection circuitry disconnects the input from the output in response to a power surge; and,
   a housing connected to the circuit board, the housing defining a plurality receptacles for receiving a plurality of data connectors, the receptacles disposed such that connectors received by the receptacles will electrically couple to the input and the output, respectively, of the circuit board, the housing including an inhibiting member that interferes with a portion of the chassis with the module received by the chassis to inhibit separation of the module from the chassis.

15. The module of claim 14 wherein the inhibiting member is flexible and includes a tab, the inhibiting member being configured to have the tab urged inwardly by the chassis during insertion of the module into the chassis and to move outwardly when the tab aligns with an opening provided by the chassis such that the tab will interfere with the chassis if the module and chassis are urged to separate.

16. The module of claim 15 wherein the tab is rounded.

17. The module of claim 14 wherein the housing includes a plurality of grip portions configured to be grasped by a user for pulling the housing to separate the module from the chassis.

18. The module of claim 17 wherein the grip portions provide grooves extending transverse to a direction of insertion of the module into the housing.

19. The module of claim 18 wherein the housing provides two grip portions that extend away from a front face of the housing and that are disposed near a top and a bottom of the housing, respectively.

20. A rack-mountable in-line surge protection system comprising:
   a chassis that mounts to an equipment rack, the chassis providing a grounding network from an interior of the chassis to a terminal that connects to by an external ground connector when the connector is received by the terminal; and
   a plurality of modules that releasably insert into the chassis, the modules each connecting to a plurality of data line connectors when inserted into the chassis, the modules providing a surge-protected electrical connection between the plurality of connectors connected to each module that becomes disconnected in response to an electrical surge;
   wherein the modules and the chassis inhibit separation of the modules and the chassis with the modules urged to separate from the chassis, and allow separation of the modules from the chassis upon application of at least a threshold separation force.

21. The system of claim 20 wherein the chassis and the modules are configured such that the threshold separation force is at least about 1 pound.

22. The system of claim 21 wherein the chassis and the modules are configured such that the threshold separation force is at least about 2 pounds.

23. The system of claim 20 wherein the chassis has a height of about 1 U.

24. The system of claim 20 wherein surge protection of different modules is configured differently to provide surge protection for different types of data lines, and wherein the modules each include a visual indication of a type of data line for which the surge protection of the respective module is configured.

* * * * *